(12) United States Patent
Burris et al.

(10) Patent No.: US 12,083,878 B2
(45) Date of Patent: Sep. 10, 2024

(54) FUEL TANK FLOATING SUCTION LINE WITH LEVEL INDICATOR

(71) Applicant: TopFlo LLC, Charleston, SC (US)

(72) Inventors: Steve Burris, Charleston, SC (US); Bill Kahler, John's Island, SC (US)

(73) Assignee: Fuel Tank Optics, LLC, Charleston, SC (US)

( * ) Notice: Subject to any disclaimer, the term of this patent is extended or adjusted under 35 U.S.C. 154(b) by 0 days.

(21) Appl. No.: 17/707,198

(22) Filed: Mar. 29, 2022

(65) Prior Publication Data

US 2023/0311644 A1    Oct. 5, 2023

(51) Int. Cl.
*B60K 15/03* (2006.01)
*B60K 15/077* (2006.01)

(52) U.S. Cl.
CPC .. *B60K 15/077* (2013.01); *B60K 2015/03217* (2013.01); *B60K 2015/03309* (2013.01); *B60K 2015/03453* (2013.01); *B60K 2015/0772* (2013.01)

(58) Field of Classification Search
CPC ............... B60K 15/077; B60K 15/061; B60K 2015/03217; B60K 2015/03309; B60K 2015/03453; B60K 2015/0772; B60K 2015/03289
USPC ............ 220/262, 202; 137/202, 565.37
See application file for complete search history.

(56) References Cited

U.S. PATENT DOCUMENTS

| | | | |
|---|---|---|---|
| 3,925,747 A * | 12/1975 | Woodward | G01F 23/36 73/317 |
| 10,975,814 B1 * | 4/2021 | Matusek | F02M 37/106 |
| 2014/0238515 A1 * | 8/2014 | Thirlaway | B60K 15/03 137/590 |
| 2018/0234748 A1 * | 8/2018 | Haddy | G01F 23/804 |

\* cited by examiner

*Primary Examiner* — Nathan J Jenness
*Assistant Examiner* — Elizabeth J Volz
(74) *Attorney, Agent, or Firm* — Bernard G. Pike, Esq.; Pike IP Law, PLLC (57) ABSTRACT

Embodiments of a fluid tank may comprise tank system that comprise a level indicator system useful for measuring the amount of fluid in the tank and a floating suction tube useful for filling or removing a fluid from the tank. Further in some embodiments, the tank system may be installed in a single port on the fluid tank.
Some fluid tanks comprise stratified layers of different fluids. A buoyant portion of the suction tube can be constantly submerged in a desired portion of the fluid, allowing the desired fluid to be removed through the inlet port. The level indicator system may include a cable system connected between a biased level indicator that moves in conjunction with the movement of the buoyant portion to indicate the fluid level. In the alternative, the level indicator system can include sensors on the suction tube to remotely monitor the level of liquid in the tank; sensors include inclinometers, accelerometers, sending units, and magnetostrictive sensors.

14 Claims, 11 Drawing Sheets

FUEL TANK FLOATING SUCTION LINE WITH LEVEL INDICATOR

FIELD OF THE INVENTION

This invention relates to a fluid tank and a suction tube system for adding or removing fluid from the tank. The fluid tank may be a fuel tank for storing petroleum fuel or other organic liquid, for example: The suction tube system may comprise a suction tube or pipe (hereinafter "suction tube") that rises and lowers with the fluid level in the fluid tank to maintain an inlet nozzle of the suction tube within the desired fluid. The suction tube may additionally work in conjunction with a level indicator system to indicate a fluid level within the tank.

BACKGROUND OF THE INVENTION

The storage of fluids, particularly petroleum fuels or other organic liquids, can cause a slew of issues. Petroleum fuels, for example, are organic chemicals that can react with air, absorb, and react with water, and stimulate microbial growth during storage. Fuels typically have a short shelf life and will deteriorate with time. As a result, when fuel is stored, pollutants and water may collect, both of which settle to the bottom of the fluid tank. The heaviest immiscible components collect towards the bottom of the fluid tank. The fuel remains in the top portion of the tank due to the stratification of water and solids.

Conventional fuel suction tubes are fixedly placed within a few inches of the bottom of a storage tank to optimize the usable volume. Because the suction tube is near the bottom, more fuel can be removed before the tank needs to be refilled. This is especially important for emergency power systems that must operate for extended periods of time without being refueled. This design is not ideal despite its utility in emergencies, because the suction tube draws fuel from the most polluted part of the tank.

Fuel storage tanks may be vented to the atmosphere to allow them to breathe as the temperature increases and decreases and the fluids and vapors expand and contract within the tank. Moisture, from humidity, for example, and airborne dirt and microorganisms may enter the tank through this vent. The moisture may be absorbed or condense into the fluid contaminating it. Further, the microorganisms may grow and reproduce in this environment, living in the water while feeding on the fuel. Over time, an interface layer, that can be made up of a stringy, black mass of sediments, will form between the fuel layer and the water layer. Additional sediments also form on the tank bottom as byproducts of the microorganisms' biological processes. As a result, the pH of accumulated water drops providing a corrosive environment.

Many storage tanks also have a return fuel line through which unused fuel is discharged back into the tank. The problem of suspended sludge accumulating near the bottom of the tank is compounded when diesel engines dump fuel back into the tank through this line.

Modern sophisticated equipment that consumes fuel can have little tolerance for dirty, contaminated fuel. For example, the orifices on injectors are smaller to make diesel engines more fuel efficient. Consequently, the potential for injection wear is greater when fuel is delivered from a contaminated source. Moreover, due to the present practice of introducing chemicals to the fuel through the cracking process (to increase yield), current fuel types are more dynamic, and will precipitate particles that link together to form additional sludge.

Various attempts have been made for reducing the previously identified problems associated with stored fuel. Fuel storage tanks are typically inspected and periodically cleaned to remove the buildup of contaminants. In addition, biocides or biostats can be added to the tank to destroy or inhibit the growth of microorganisms. Finally, filters can be installed and periodically changed. Because of budget constraints and differing maintenance philosophies, however, such measures are not always taken.

The invention of floating suction lines is one recent attempt to address the issues with the tank storage of fuel and other fluids. Floating suction lines provide product from higher in the column of fluid which is void of contaminants. The problems with currently existing floating suction lines are methods of buoyancy, verification of proper operations, and restrictive entry ports. The present invention system addresses these issues. Deploying current floating suction lines requires a manned entry into the tank. This is because the size of the floats or jointed swivels being used will not fit through the standard 4-inch openings on top of the tank therefore the manhole cover must be removed to get access to the fuel pick-up line. To do a manned entry, the tank must be emptied, cleaned and vapor free. Logistically, there must be another tank available to house the inventory of the tank being serviced. Manned entries can be hazardous and labor intensive. Once inside the tank, the plumbing for the floating suction line must be attached to the fuel line then the float must be tethered to the floating line. Finally, the level indicator must be attached to the floating suction line. The site gauge tethered to the level indicator requires an addition 4-inch port on top of the tank to exit. Not all tanks are equipped with a 36-inch manhole for internal access. There are also a limited number of 4-inch ports available on top of the tank as vents as automatic tank gauges (ATGs) usually occupy these ports.

BRIEF SUMMARY OF THE INVENTION

An embodiment of the tank comprises a suction tube system comprising a float or buoyant portion, suction tube, and level indicator into a system that can be installed through an inlet port of a tank such as, but not limited to a single 4-inch port on the tank, for example. There are no additional floats, swivels, or tethers to attach for installation, operation, or removal of the suction tube from the tank. The present invention comprises a portion that floats near the top of the fluid within the tank. When fluid is drawn from the tank, the present invention allows withdrawal of clean fluid, such as petroleum fuels, and avoidance of the contaminants usually found in the bottom or top surface layers of a stratified fluid within the tank.

The suction tube system may further comprise at least one of level indicator system, fluid outlet port, and a check valve. In certain embodiments, the system may make manned entry for installation or removal unnecessary and allows all installation and removal work to be completed from the outside of the tank for reduced installation costs, improved safety, and hygiene. The tank, system, and methods save time and money and is not as hazardous as previous systems for storing fluids, especially fuel. Only one aperture or port may be required for installation of the present invention, as opposed to conventional suction systems.

In an embodiment, a fluid tank comprises a suction tube system that may be installed through an inlet port of the fluid tank. The fuel tank comprise an inlet nozzle and a suction tube system configured to be at least partially inserted through and connected to the inlet port of the fluid tank. In certain embodiments, the suction tube system comprises a connection portion configured to connect to the inlet port, a flexible suction tube, an inlet portion of the suction tube distal to the inlet nozzle, and a float or buoyant portion connected to the flexible suction tube.

The float or buoyant portion may be connected to the flexible suction tube by a cable and/or a clamp. The cable may be fixedly connected to at least one of the float or buoyant portion and the flexible suction hose and slidingly connected to the other of the float or buoyant portion and the flexible suction hose.

The suction tube system may also comprise a level indicator system that is able to measure the distance between the float or buoyant portion of the suction tube system and the inlet nozzle, thereby determining the level of fluid within the fluid tank. The fluid tank may also comprise a connector that may be connected to the inlet nozzle and that connector may define a fluid outlet aperture with the suction tube being in fluid communication with fluid outlet aperture. In additional embodiments, the inlet nozzle may be within the tank and, if a fluid is present, submerged in the fluid in the tank, and the flexible suction tube defines a rotational range of movement of the rigid buoyant portion.

In embodiments of the fluid tank, the tank may be used for storage of petroleum or diesel. The level indicator system may comprise a level indicator tube, a cable comprising a first end and second end wherein the first end is connected to the suction tube or the float or buoyant portion, a level indicator within the level indicator tube wherein the level indicator is connected to the second end of the cable. In another embodiment, the connector defines a level indicator aperture and the cable extends through the level indicator aperture and into the level indicator tube, and wherein a position opposite of the connector indicates a higher level in the fluid tank. The level indicator system may also comprise a biasing member that biases the level indicator in a direction opposite of the connector or cable connection.

In yet another embodiment of the invention, the float or buoyant portion may float in a top section of a fluid within the fluid tank causing the flexible suction tube to bend and thereby reducing a distance between the float or buoyant portion and the connector, and wherein reducing the distance may cause the cable to be further biased into the level indicator tube and raising the level indicator within the level indicator tube.

As used herein, the terms "float", "buoyant portion", and "flexible" in flexible suction tube are all related. The float and buoyant portion must be buoyant enough to cause the flexible suction tube to bend as the fluid level in the tank is raised and the flexible tube must be able to bend or unbend as the float or buoyant portion moves up or down with the fluid level in the tank.

In additional embodiments, the inlet nozzle may be submerged in a fluid in the tank, and the flexible tube defines a rotational range of movement of the rigid buoyant portion. Embodiments of the present invention comprise alternative methods, including data from sensors, to indicate the fluid level of the tank. Sensor data may be relayed to a CAN open interface or an MSD BUS to be interpreted to determine the fluid level of the tank.

DETAILED DESCRIPTION

A fluid tank for storage and removal of fluids, including, but not limited to, organic liquids such as petroleum fuels or diesel fuel (hereinafter "petroleum fuel" or "petroleum fuels") may require specifically design piping systems or suction tube systems to provide clean fuel for modern machinery such as diesel power generators. The fuel cannot be reliably withdrawn from the bottom of the fluid tank because the density of most organic liquids and petroleum fuels are typically less than water and are immiscible in the water. Therefore, water and other debris will collect on the bottom of the tank. Other debris may float on the top of the fluid. Therefore, some fluid tanks such as diesel fuel tanks comprise suction tube systems that allow the fluid to be removed from the clean fluid in the middle of the inventory.

Embodiments of the tank may comprise an inlet port on top or adjacent to the top of the tank. The tank may further comprise a suction tube system inserted through and connected to the inlet port. The suction tube system comprises components that allow clean petroleum fuel to be removed from the tank reliably.

As such, embodiments of the tank may comprise an inlet port and a suction tube system connected to the inlet port. As such, the suction tube comprises a connector configured to connect to the inlet port and an inlet nozzle that is maintained within the fluid. Embodiments of the suction tube system comprise a flexible suction tube connected to a float or buoyant portion that causes the flexible suction tube to flex and rise with a rising fluid level in the tank. The flexible suction tube may be connected to the tank adjacent to the inlet port and the buoyant portion may be distal to the inlet port. The inlet nozzle may be in the float, buoyant portion, or in flexible suction hose to allow reliable suction of clean petroleum fuel from the stratified layers of fluid in the tank.

The suction tube system may further comprise a level indicator system. In embodiments of the suction tube system, the level indicator measures the distance between the float or buoyant portion and the inlet port of the tank to estimate the level of fluid in the fluid tank.

Figure 1:
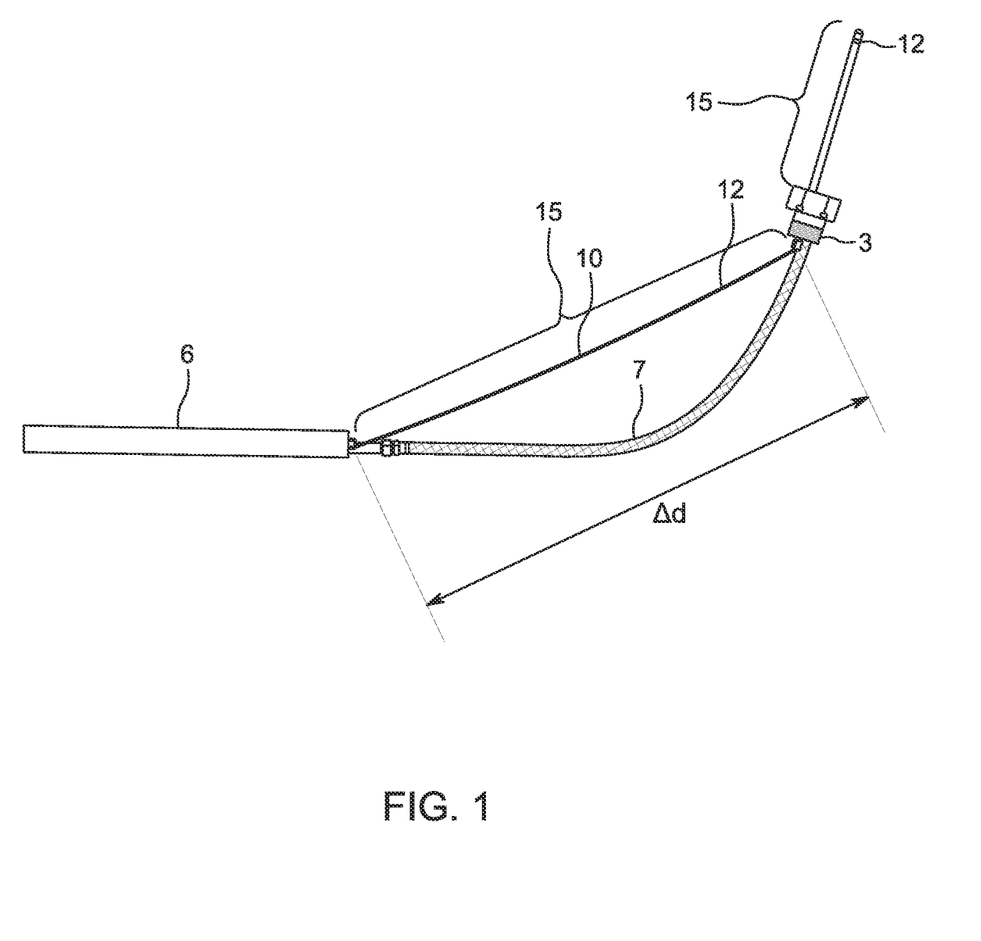
FIG. 1 shows a partial view of the embodiment of the present invention, showing a suction tube and a level indicator system, with the flexible suction tube of the suction tube in a bent orientation.
Figure 5:
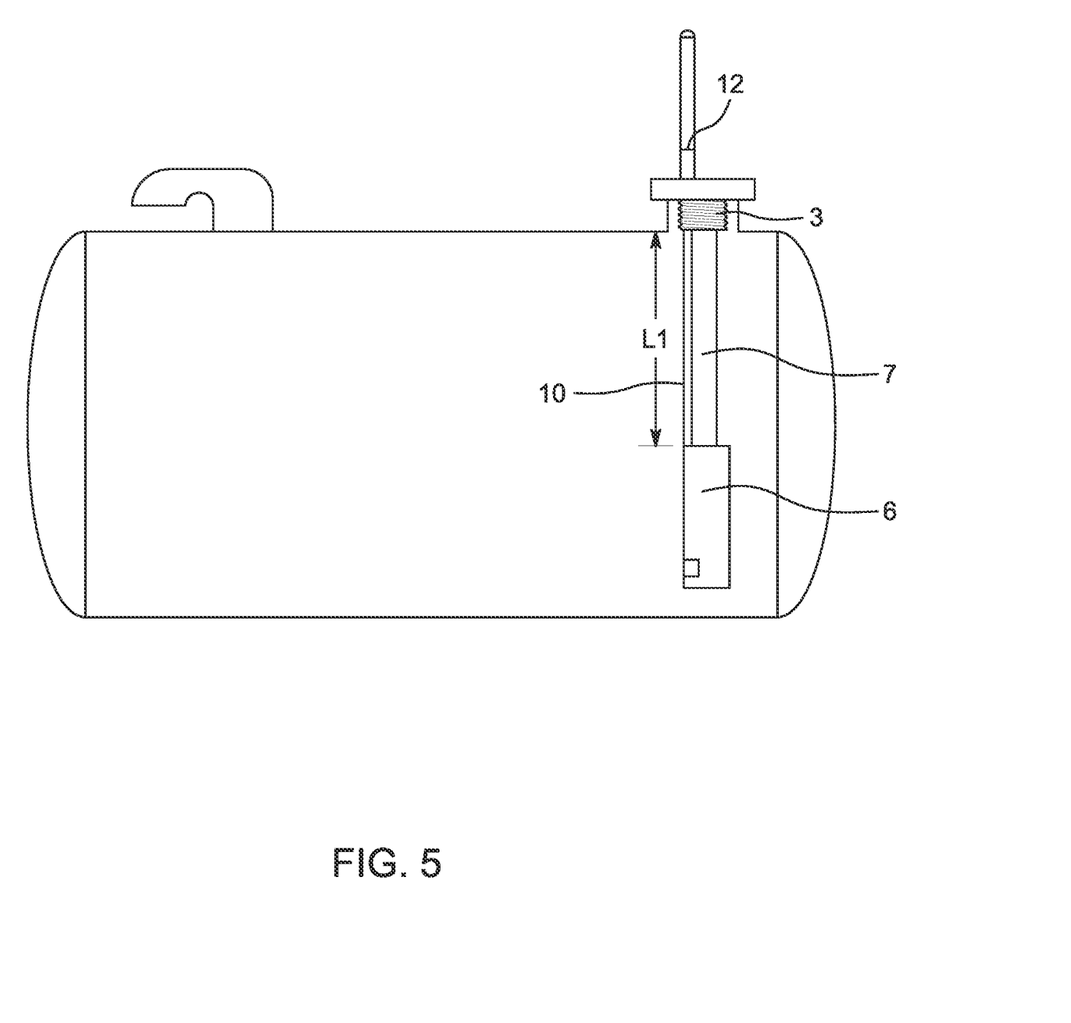
FIG. 5 shows a partial view of an additional embodiment of the present invention.
Figure 6:
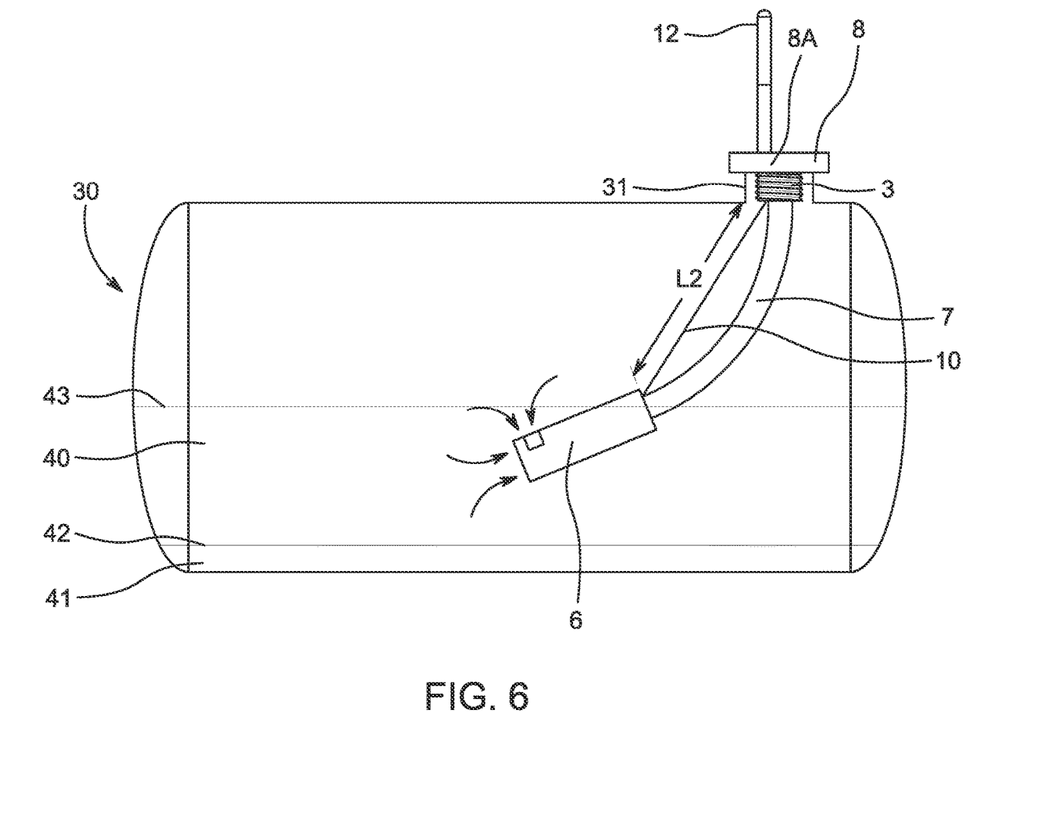
FIG. 6 shows an embodiment of a tank having a suction tube system, wherein the tank is empty.
Figure 7:
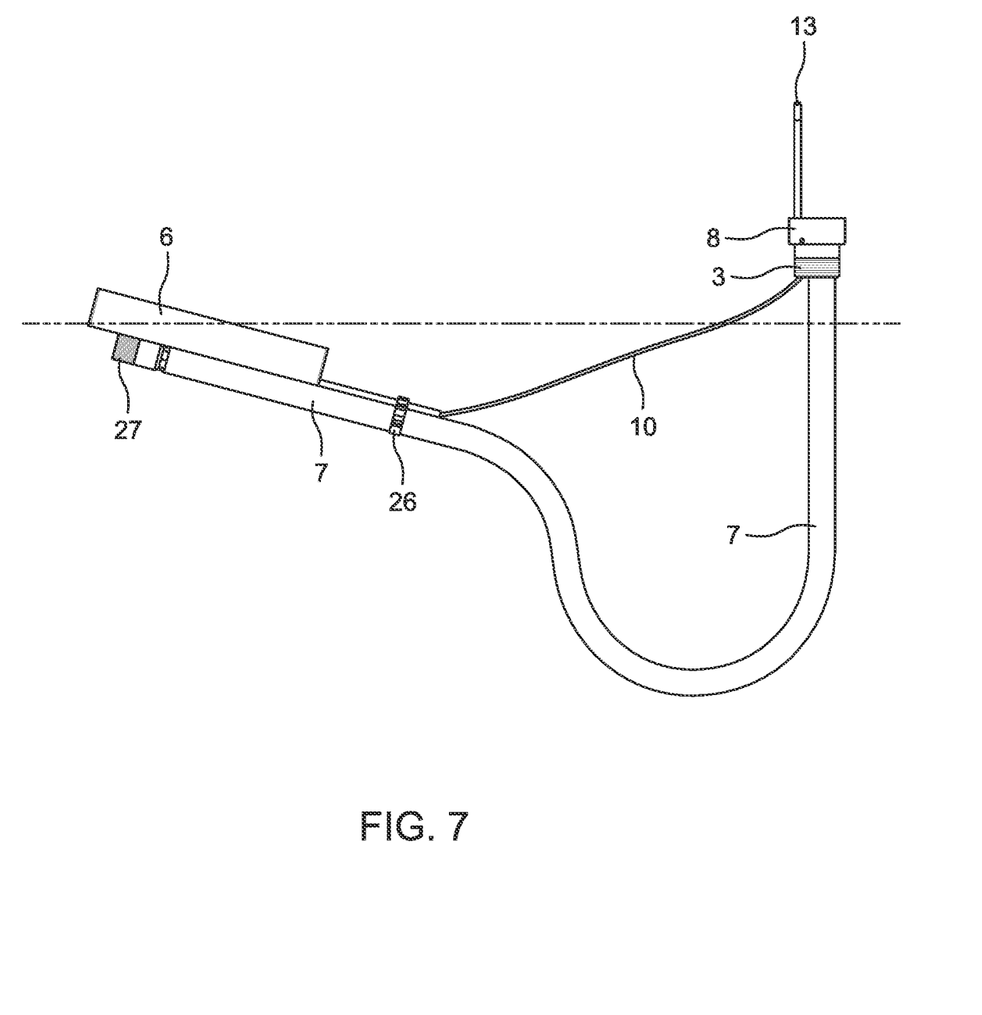
FIG. 7 shows an installed embodiment of the suction tube system wherein the float or buoyant portion is floating on liquid within the tank and raising the inlet nozzle above the stratified liquid on the bottom of the tank; retaining the inlet nozzle below the float and submerged at all times.

Referring now in detail to the figures, wherein like reference numerals represent like parts throughout the several views, FIG. 1 illustrates a view of an embodiment of the tank and the suction tube system. The suction tube system comprises a flexible suction tube 7 and a level indicator system 15. FIG. 1 does not show a tank body or its inlet port. The inlet port 1 is located on the tank body as shown in FIGS. 5, 6, and 7, for example.

Basic fuel and fluid tanks can come in different shapes, sizes, and materials and are known by persons having ordinary skill in the art. In the present invention, the tank body comprises at least one aperture or inlet port, one of the inlet ports being able to be connected to a connector on the suction tube system. The flexible suction tube 7 will be inside the volume of the tank when the connector is connected to the inlet port.

The inlet port on the tank body may be a type that allows connection of piping or other devices to the inlet port such as male or female threaded connection, flanged connection, a quick connection, or other connection type. The suction tube system will comprise a connector complementary to the connection type of the inlet port.

The suction tube system comprises a connection portion 3, an inlet portion 4, an inlet nozzle 5, a float or buoyant portion 6, and a flexible suction tube 7. The float or buoyant portion 6 is able to float in or near the uppermost portion of fluid in the fuel tank while flexing the flexible suction tube 7. In FIG. 1, the float or buoyant portion 6 may be made of a foam material, a closed cell foam, a sealed hollow portion of pipe, or other material that has a bulk density less than the density of the fluid to be stored in the tank and is thus able to float and still be at least partially submerged in the petroleum fluid. The flexible suction tube 7 is able to be malleable or is able to bend, stretch, expand, or contract to permit the movement of the buoyant portion 6 submerged, partially submerged, or above the liquid in the fuel tank. In FIG. 1, the flexible suction tube is a hose that is able to bend in all directions but will not allow significant rotational torque. The flexible hose may be a metal flexible pipe, a stainless steel flexible pipe, wire reinforced hose, polymeric hose, natural or synthetic rubber hose, or any of these flexible hose materials with a metal braided cover, for example. This limiting of rotation retains the inlet nozzle to be in a submerged condition. The connection portion 3 may be reversibly attachable to the inlet port, allowing the suction tube system, or parts of it, to be connected and to be removed from the tank body for cleaning and maintenance, amongst other things.

The suction tube may also comprise a least one aperture which is able to allow fluid to be added to or removed from the tank through the flexible suction tube. In the present embodiment, the connection portion 3 of the suction tube defines a fluid outlet aperture 21 which is able to allow fluid to be added to or removed from the tank as shown.

Figure 2:
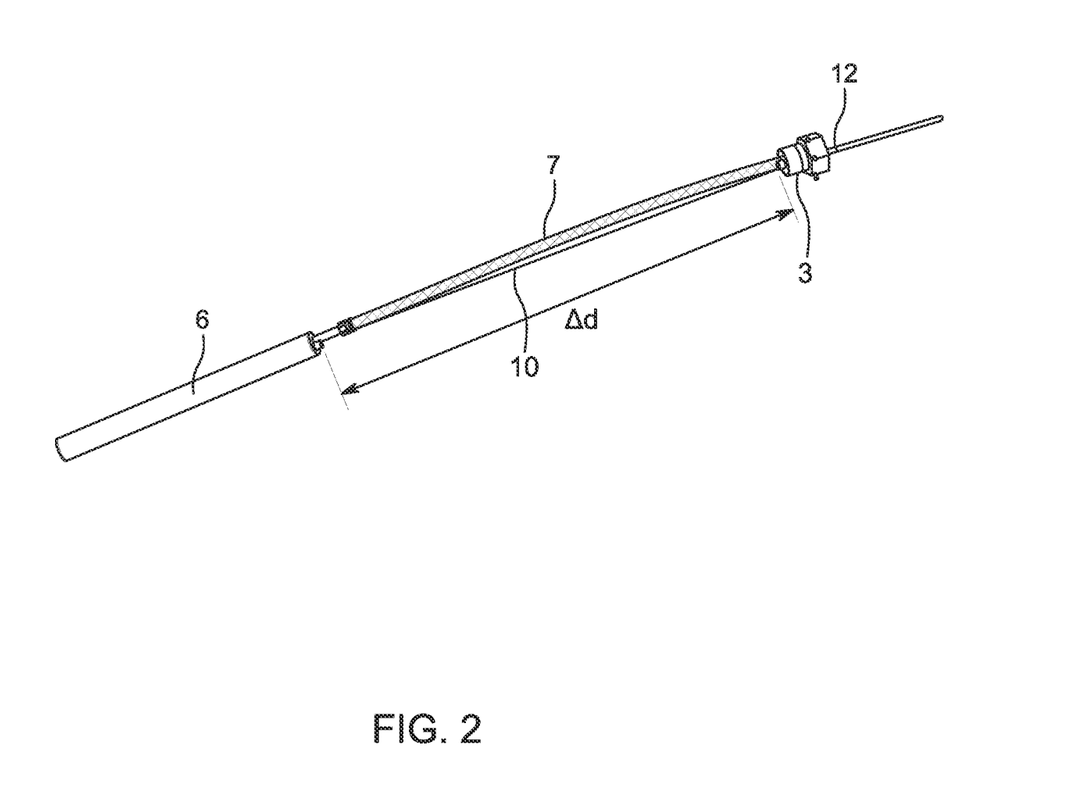
FIG. 2 shows a partial view of the embodiment of the present invention, showing a suction tube and a level indicator system, with the flexible suction tube of the suction tube in a straight orientation.
Figure 4:
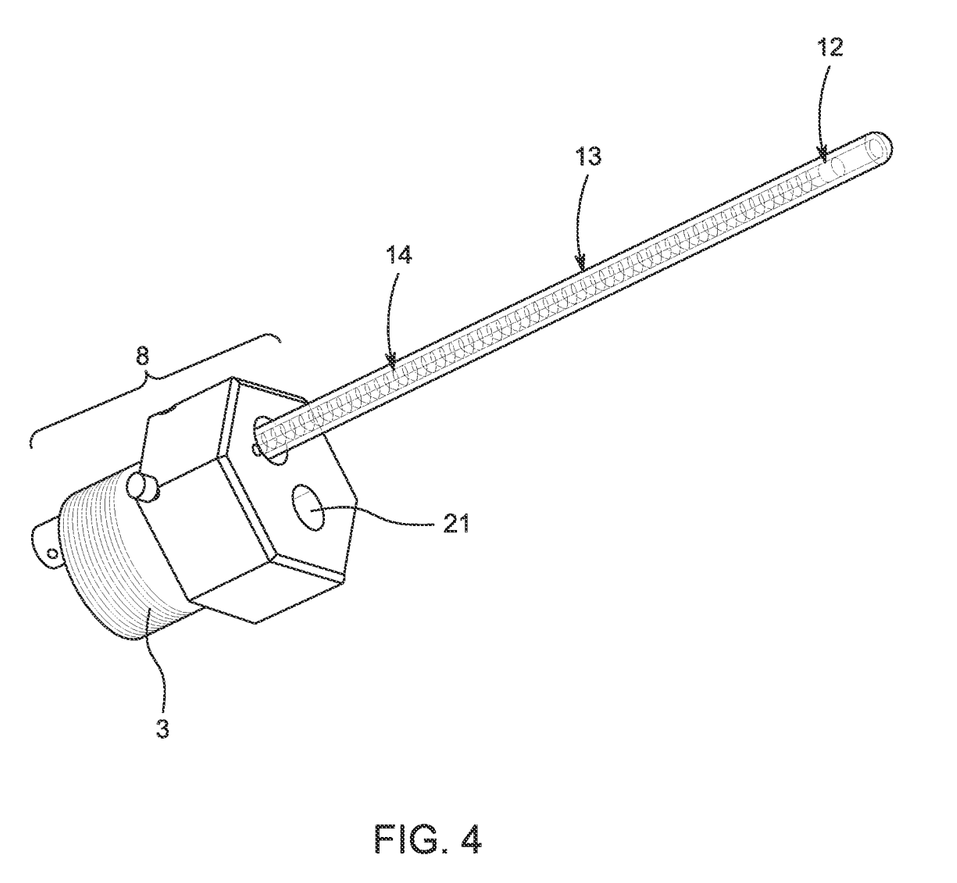
FIG. 4 shows yet another partial view of the embodiment of the present invention, showing a closer view of portions of this embodiment of the invention.

Referring to the embodiment of the suction tube system shown in FIG. 1, FIG. 2, and FIG. 4, in this embodiment, the level indicator system 15 comprises a cable 10, a level indicator ("indicator") 12, a level indicator tube 13, and a biasing member 14. The level indicator system 15 measures the distance, $\Delta d$, between the buoyant portion 6 and the inlet port to determine the level of fluid in the fluid tank. In this embodiment, the cable 10 extends from a connection point on the float or buoyant portion 6 (alternatively the cable may be connected to the flexible suction tube) and through the connection portion 3 to connect to the level indicator. The connection portion 3 of the suction tube system, when connected to the inlet port, allows the cable 10 to extend across the distance, $\Delta d$, between the inlet port and the connection point.

In embodiment, the connection portion 3 defines at least two apertures, one to allow the cable to extend through the connection portion into the level indicator tube and one to allow further piping to be connected in fluid communication with the suction tube. The two apertures are shown in FIG. 6A showing the level indicator aperture and the inlet port in the connection portion.

Figure 6A:
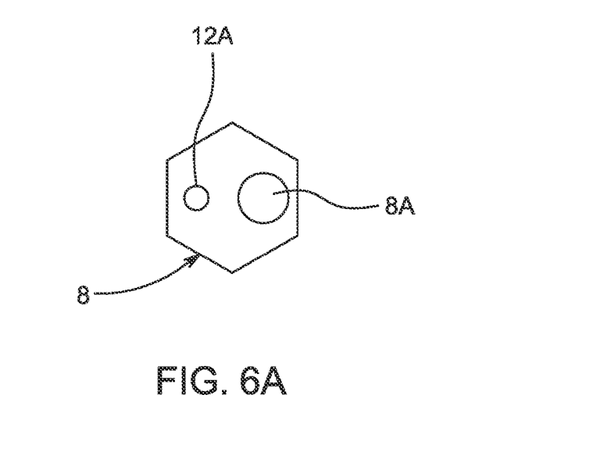
FIG. 6A depicts the embodiment of the connection portion 8 from a top perspective view.
Figure 6B:
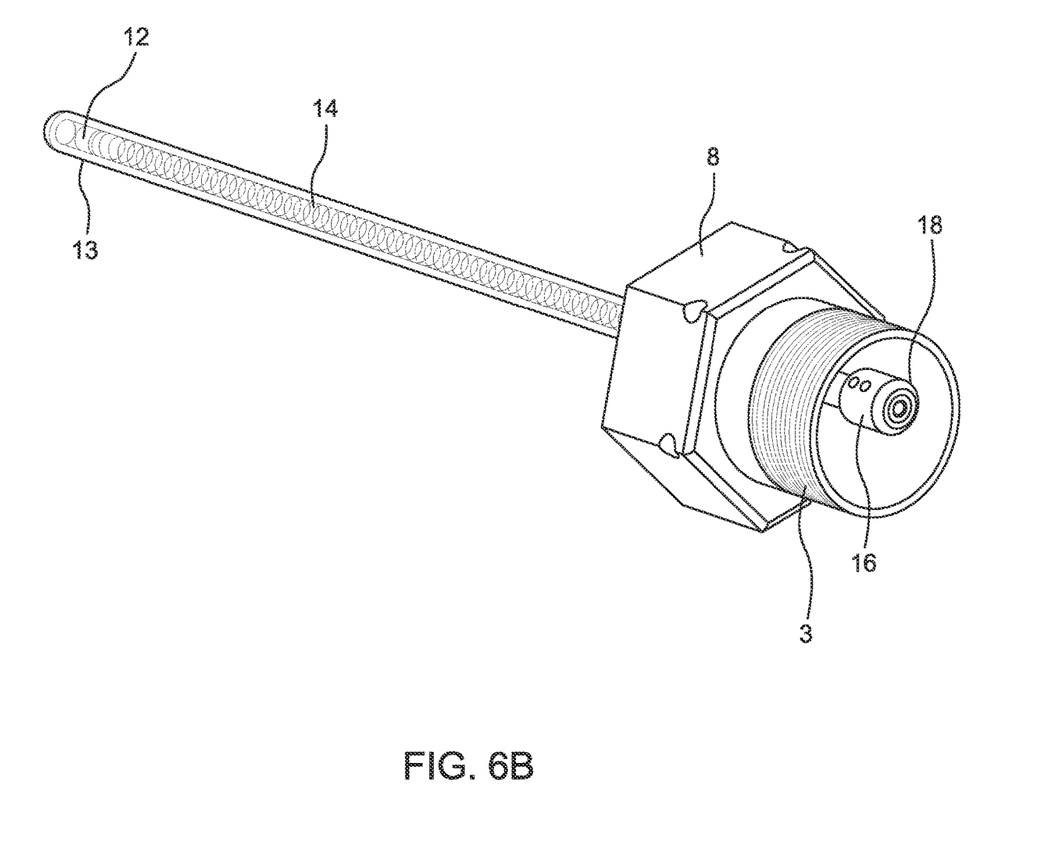
FIG. 6B depicts an embodiment of the connection portion 8 from a bottom perspective view.

FIG. 6A depicts the embodiment of the connection portion 8 from a top perspective view and FIG. 6B depicts an embodiment of the connection portion 8 from a bottom perspective view. This view shows the level indicator system extending through an aperture 12A wherein the cable 10 passes through into the level indicator tube 13 and is connected to level indicator 12. The level indicator tube is shown in this embodiment with a cap 16. The cap 16 is on the open end of the level indicator tube and retains the biasing member 14 (shown as a spring) and the level indicator 12 within the leveling indicator tube 13. A hard bearing 18 is connected to the cap 16 (in other embodiments, the hard bearing may be connected directly to the level indicating tube 13) and prevents the cable 10 from abrading the cap 16 of the level indicating tube 13. The hard bearing may be made of any abrasion resistant material such as, but not limited to, glass, ceramic, carbide, or a hardened steel, for example.

When the tank is full (or has a high fluid level as shown in FIG. 7.) the flexible suction tube 7 is in a bent condition, which shortens the distance, $\Delta d$, (L3 is shorter than either L1 or L2) between the buoyant portion 6 and the inlet nozzle. The level indicator tube 13 is connected to the connection portion 3 over the level indicator aperture and is comprised of a cylindrical tube and, in some embodiments a glass window, which configured to house the biasing member 14 and the indicator 12. In the embodiment shown in FIG. 1, the biasing member 14 is a spring, and the indicator 12 is located on or near one end of that spring. The change in distance $\Delta d$ between FIG. 1 and FIG. 2 displays the function of the level indicator system 15 in this embodiment of the invention; as the distance $\Delta d$ between the inlet nozzle and the buoyant portion 6 changes, that change is accurately reflected by less of the cable 10 being with the tank and more within the level indicator tube, which in turn influences the biasing member 14, which in turn influences the position of the indicator 12 within the level indicator tube 13. The position of the indicator 12 within the level indicator tube 13 may relate to units of liquid measurement, that can be seen, read, interpreted, or otherwise sensed to relay precise information about the level of fluid in the tank. The distance decrease in shown in FIG. 5, FIG. 6, and FIG. 7 as the fluid level 43 increases from an empty (FIG. 5), approximately half full (FIG. 6.), and approximately full (FIG. 7). These figures shown that L1 is longer than L2 which are both longer than L3. Even though the fluid 40 level increases and the hose bends into tighter radius, the rigidity of the hose keeps the inlet nozzle submerged below the fluid level 43 of the surface but above the water/fuel interface 42 and the water level 41.

In some embodiments, the weight of the hose 7 relative to the buoyancy of the buoyant portion and the attachment of the suction hose on a bottom portion of the buoyancy portion prevents inlet nozzle of the hose 7 from floating to the surface allowing the inlet nozzle to float above the fluid surface. Other embodiments may have different hoses that retains the inlet nozzle 5 in a submerged condition when the tank is full. A thick polymeric or rubber hose 7 or an otherwise sufficiently resilient hose 7 will prevent the inlet nozzle 5 from rising above the fluid level but sufficiently flexible to allow the hose 7 to rise as the fluid level increases. The position of the inlet nozzle 5 in relation to the float or buoyant portion keeps inlet nozzle 5 from rising above the fluid level.

Figure 3:
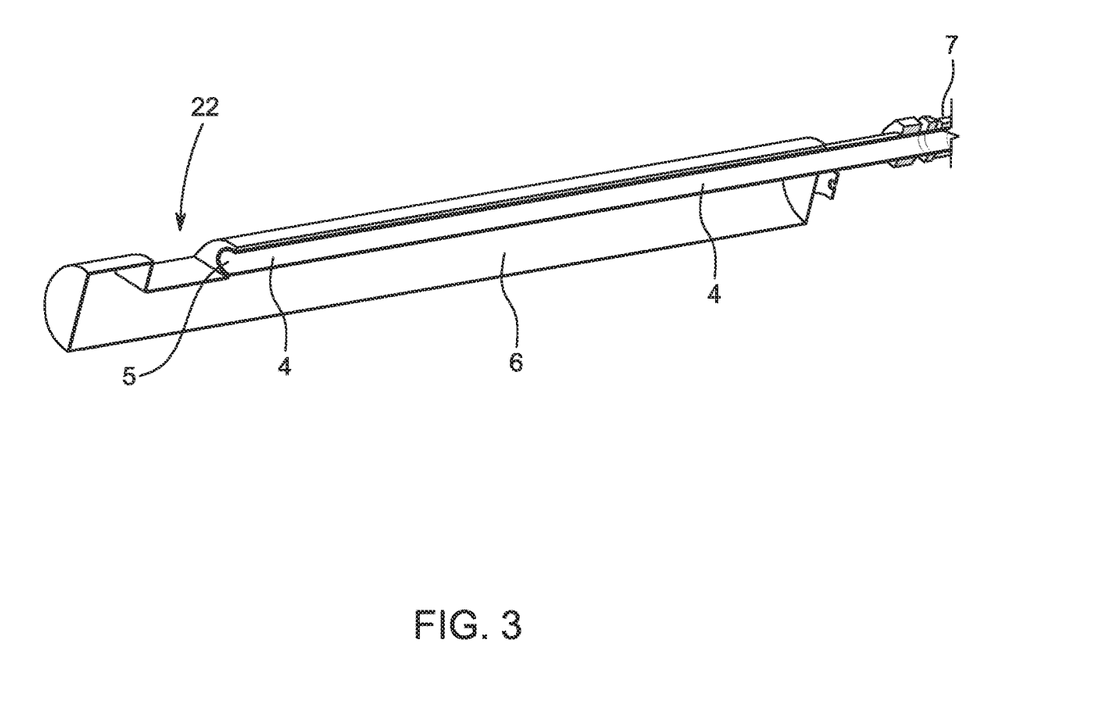
FIG. 3 shows another partial view of the embodiment of the present invention, with a cutaway view of the internals of this embodiment of the invention.

FIG. 3 shows a cutaway view of the embodiment of the present invention. In this embodiment, the inlet portion 4 may be housed within the float or buoyant portion 6, and the inlet portion 4 comprises an inlet nozzle 5. In other embodiments, the inlet portion or inlet nozzle may be external to the float or buoyant portion. The inlet nozzle 5 allows fluid to be added to or removed from the tank via the inlet portion under the top of the fluid level. The inlet portion 4 is in fluid connection with the flexible suction tube 7. The inlet nozzle is able to stay completely submerged, allowing only liquid to enter.

Now looking to FIG. 5, in another embodiment of the present invention, the suction tube system comprises a connector 8, which is connected to the tank inlet port 1 and may serve to increase the ease of attaching the suction tube system to a tank. The suction tube system may be permanently connected (welded, for example) or reversibly connected (by threaded connection, flanged connection, or a quick connect, for example). In the depicted embodiment, the connector 8 also comprises a fluid outlet aperture 21, which is in fluid communication with the suction tube and can be used to insert or remove fluid from the fluid tank via the suction tube. The connector 8 also may also comprises a check valve (not shown) or the suction tube may comprise a foot valve, which is in fluid communication with the fluid outlet aperture and is able to retain liquid in the line of the suction tube.

In certain embodiments, the inlet nozzle 5 may be positioned on the top of the float or buoyant portion 6 on the distal end of the float or buoyant portion, external to the float or buoyant portion, or anywhere on the perimeter of the that remains submerged as the fluid level in the tank is increased from a low level that first covers and causes the inlet nozzle 5 to be submerged as fluid is withdrawn from the tank.

Figure 8:
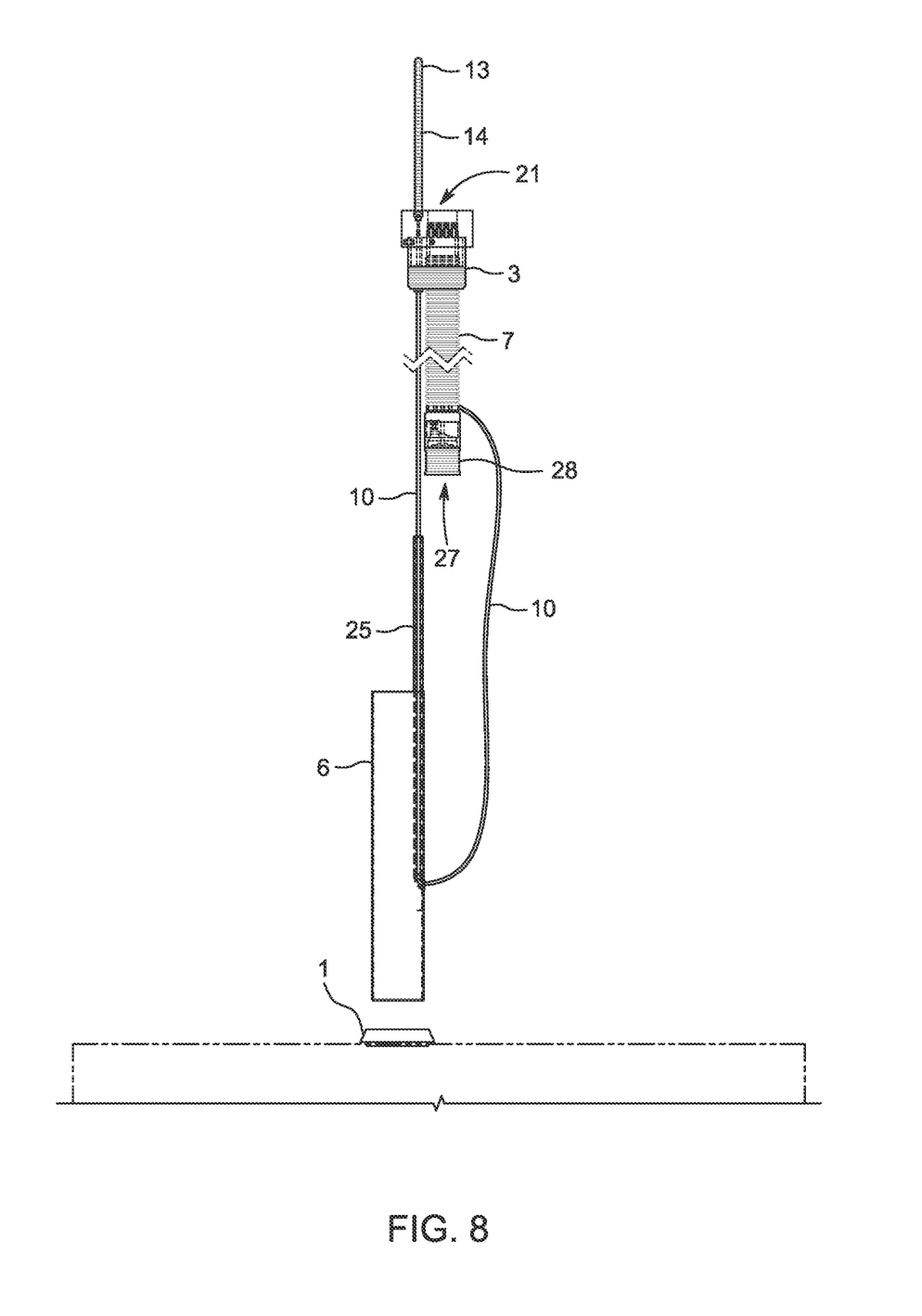
FIG. 8 depicts the embodiment of the suction tube system of FIG. 7 prior to installation through the inlet port into the tank, at this point the suction hose and the float have not been drawn together by the cable so that the float or buoyant portion may be inserted through the inlet port separately from the suction hose.
Figure 9:
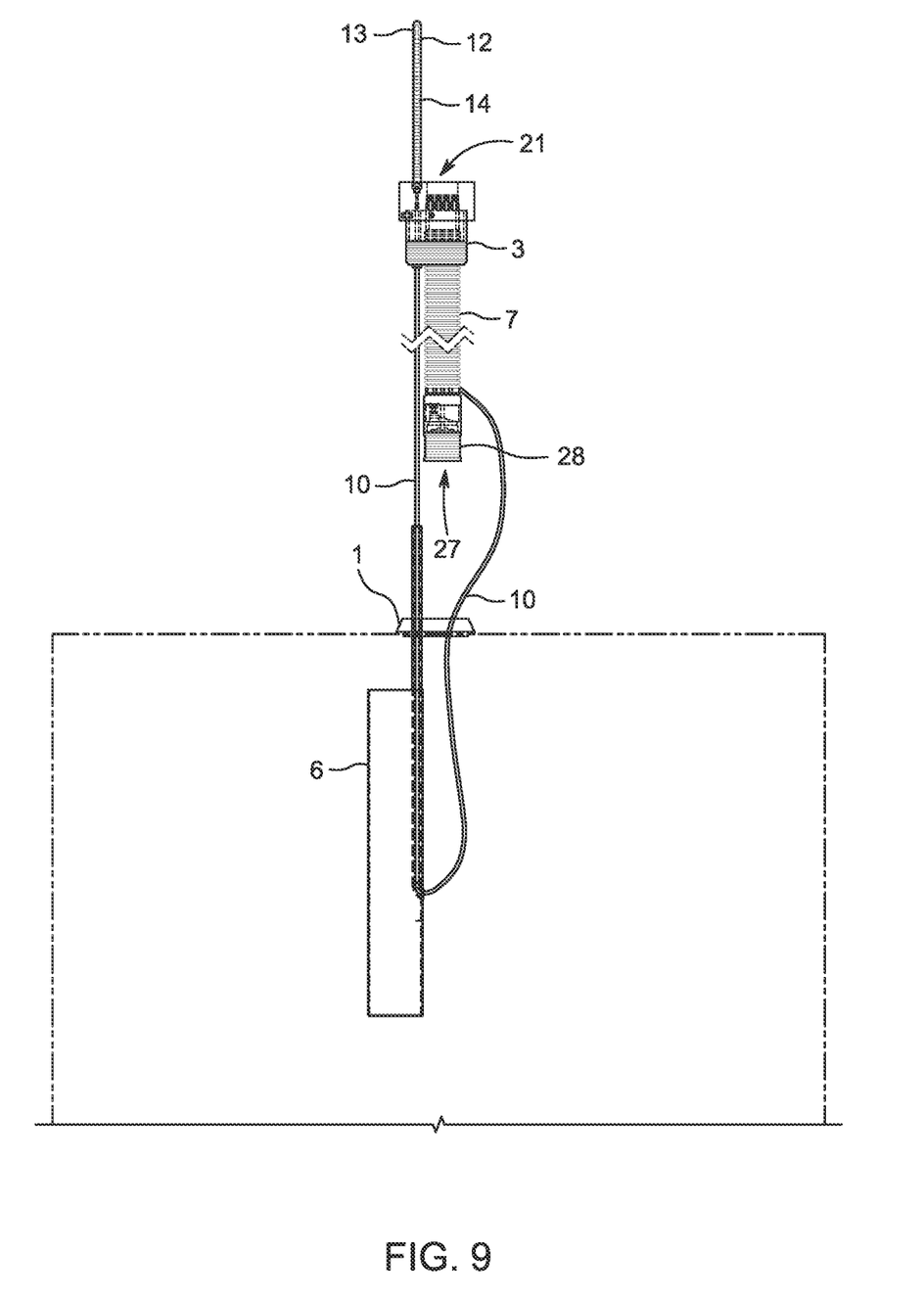
FIG. 9 depicts the embodiment of the suction tube system of FIG. 7 after the float or buoyant portion has been inserted through the inlet port but prior to the suction hose being inserted through the inlet port, a clamp or other connector may be used to fasten the suction tube to the float or buoyant portion or the cable tube at this point.
Figure 10:
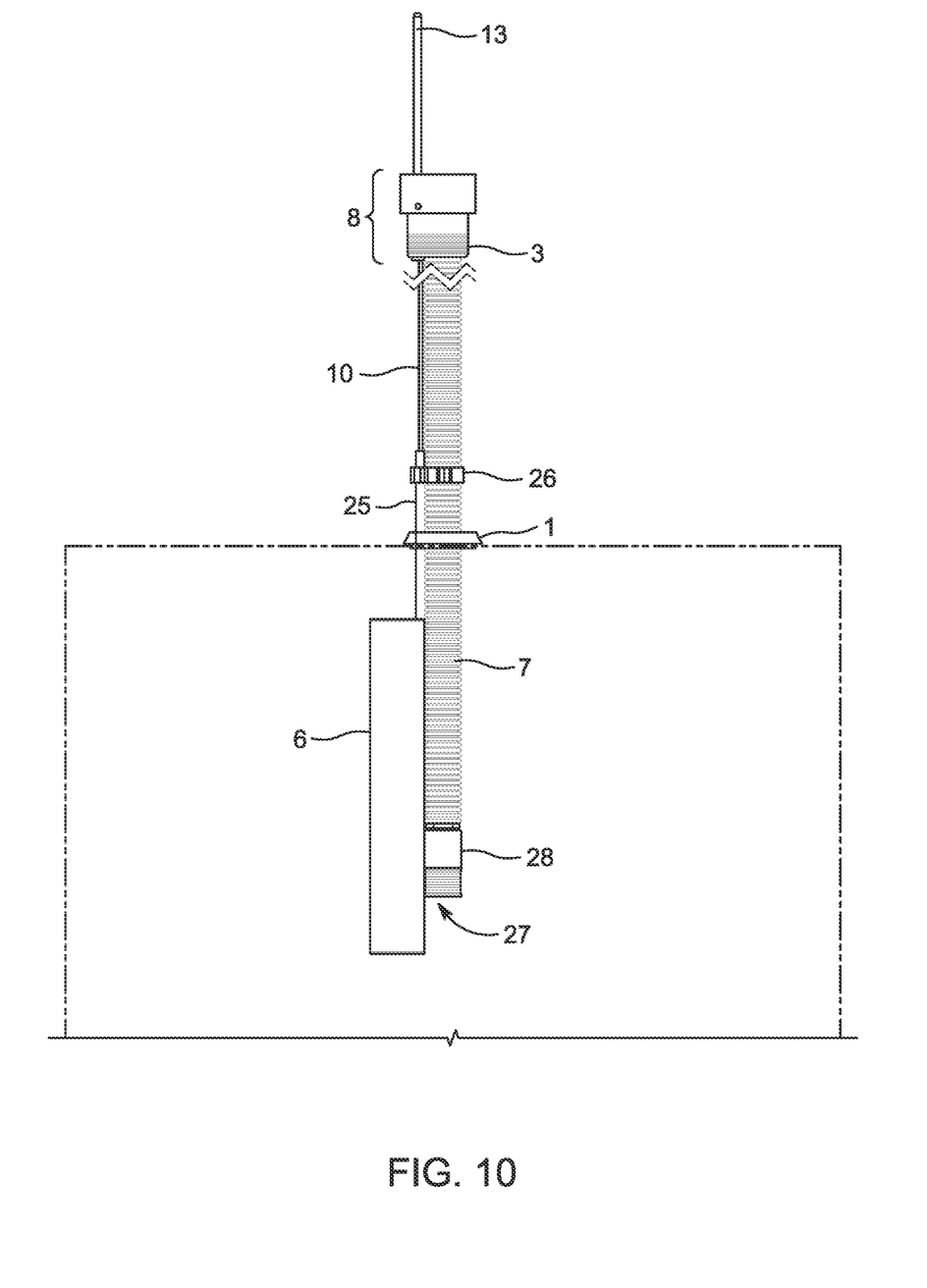
FIG. 10 depicts the embodiment of the suction tube system of FIG. 7 after the float or buoyant portion has been inserted through the inlet port and the suction tube has been at least partially inserted into the tank and the cable has been drawn connecting the suction hose to the float and the other end of the cable connected to the level indicator system.

Another embodiment is shown in FIG. 8, FIG. 9, and FIG. 10, the tank of this embodiment comprises a tank having a tank inlet port 1 and a suction tube system. The suction tube system may comprise a connector 8, a flexible suction tube 7 and a float or buoyant portion 6. The connector 8 may comprise a connection portion 3 configured to be connected to the tank inlet port 1. The connection portion 3 has a complementary connector to connect the suction tube system to the tank inlet port.

The suction tube system comprises a flexible suction tube or flexible tube 7 connected to the connector 8 and in fluid communication with the fluid outlet aperture 21. The fluid outlet aperture 21 may comprise a piping connection point. The piping connection point may comprise a threaded connection, a quick connection, a flanged connection, a clamped hose connection, or other pipe or hose connection. Piping may be connected to the piping connection point to connect the suction tube system to a fuel supply system such as for a diesel engine or other back up power generator.

The flexible suction tube 7 comprises a fluid communication pathway between an inlet nozzle 27 that allows fluid to travel from the inlet nozzle 27 through the flexible suction tube 7 and through the fluid outlet aperture 21.

The suction tube system may further comprise a buoyant portion 6 and a cable 10 connected between the buoyant portion 6 and the flexible tube 7. The cable 10 may be slidingly connected to the buoyant portion 6 such that the cable may be drawn through a connector on the buoyant portion 6. The connector may be a cable tube 25 and the cable 10 may be threaded through the cable tube 25 connected to the buoyant portion 6. The flexible tube 7 may further comprise a foot valve 28 at a distal end of the flexible tube 7. The rigid portion may be a cable tube 25. In the shown embodiment, the cable tube 25 may extend through the buoyant portion 6 and beyond: allowing the cable 10 to extend from the inlet nozzle 27, through cable tube 25, through the connection portion 3, to the biasing member 14. The clamp 26 may be used to connect the cable tube 25 to the flexible suction tube 7. The cable tube 25 may be inside of and welded to the float or buoyant portion 6.

The buoyant portion 6 or the rigid portion/cable tube 25 may be also connected to the flexible tube 7 at a second connection. The second connection may be a clamp 26, for example. The second connection may be any other connector capable of rigidly connecting to the buoyant portion to the rigid portion/cable tube 25.

The buoyant portion 6 may be connected to the flexible tube 7 (at one or two connection points) to maintain the inlet nozzle 27 in a clean portion of the fluid such as a clean petroleum fuel above and/or below the stratified layers of fluid in the tank.

The suction tube system may further comprise a level indicator system that indicates an approximate level of fluid in the tank. The level indicator system may correlate the distance between the distance between the buoyant portion 6 and the inlet nozzle 27 to the level of fluid in the fluid tank. The level indicator system may further comprise a cable 10, level indicator 12, biasing member 14, and level indicator tube 13.

The tank inlet port 1 may be any size that accommodates the suction tube system. Many conventional diesel tanks have four inch inlet port with a threaded connector. In such embodiments, both the buoyant portion and the flexible suction tube have a width or diameter that is less than the internal diameter of the inlet port such that the buoyant portion and the flexible suction tube of the suction tube system may be inserted through the inlet port such as a four inch inlet portion. In some embodiments, a four inch inlet port will have a 4.026 inch internal diameter.

In this embodiment, the suction tube system may be inserted through the tank inlet port 1 in portions; for example, the buoyant portion 6 may be inserted first, and the flexible suction tube 7 may be inserted second. The opening on the tank, the tank inlet port 1, presents a finite amount of space through which the suction tube must be inserted; the insertion of the suction tube allows each individual portion to have a greater width than would be the possible if these portions were connected in a side by side manner to each other and were inserted through the tank inlet port 1 simultaneously. Maximizing the volume of portions of the suction tube may be advantageous: allowing for a more larger diameter flexible tube 7 to insert and remove fluid from the tank more efficiently, while also allowing for a more voluminous buoyant portion 6 to alter the buoyant properties of the suction tube to suit the fluid being stored in the tank.

Embodiments also include a method of installing a suction tube into a tank. The method comprises inserting at least one of a buoyant portion and a flexible tube at least partially into a tank; inserting the other of the buoyant portion and the flexible tube into the tank; pulling a cable to draw the buoyant portion and the flexible tube adjacent to each other, wherein the cable is fixedly connected to one of buoyant portion and the flexible tube and slidingly connected to the other of the buoyant portion and a flexible tube; and connecting the suction tube system to an inlet port of the tank.

The method may further comprise connecting the buoyant portion and the flexible tube at a second connection point prior to connecting the suction tube system to the inlet port.

In such methods, the cable may be slidingly connected to the buoyant portion by a cable tube connected to or through the buoyant portion. And the method comprises pulling the cable through the cable tube to draw the buoyant portion and a flexible tube adjacent to each other.

The method may further comprise connecting the cable to a level indicator system.

In this embodiment, before the insertion of the suction tube through the tank inlet port 1, the biasing member 14 or the level indicator 12 may not be connected to the cable 10 prior to pulling the cable to draw the buoyant portion and the flexible tube together. During the process of inserting the suction tube, the cable 10 may be slack allowing the portions of the suction tube to which it is attached (or travels through) to move more freely relative to each other. The buoyant portion 6 of the suction tube may be inserted first through the tank inlet port 1, along with the cable tube 25, and a piece of the cable 10. The flexible suction tube 7 of the suction tube may be inserted second. During the insertion of the flexible suction tube 7, but after the buoyant portion 6 has been inserted, the piece of the cable tube 25 that extends beyond the buoyant portion 6 may be connected to the flexible suction tube 7 using the clamp 26. The clamp 26 may add stability to the ultimate connection between the flexible suction tube 7 and the buoyant portion 6. A more stable connection between the flexible suction tube 7 and the buoyant portion 6 is advantageous in certain tanks (such as, tanks used for storing petroleum fuel), as it allows the flexible suction tube 7 to rise with the buoyant portion 6 and with a rising fluid level in the tank, also allowing reliable suction of clean petroleum fuel from the stratified layers of fluid in the tank. After attaching the clamp 26, the remaining portions of the suction tube may be inserted, and the connection portion 3 may be connected to the tank inlet port 1. The cable 10 may also be pulled taut, pulling the inlet nozzle 27 towards buoyant portion 6, thereby connecting the flexible suction tube 7 and the buoyant portion 6. After pulling the cable 10 taut, the cable 10 may be cut to the appropriate length to attach to biasing member 14. In this embodiment, the tank is empty before the attachment of suction tube system, which means the level indicator system may be zeroed after the cutting of the cable 10.

Additional embodiments of the present invention are numerous and should not be interpreted as being limited by those described fully herein. Embodiments of the present invention comprise alternative methods, including data from sensors, to indicate the fluid level of the tank. Sensor data may be relayed to a CAN open interface or an MSD BUS to be interpreted to determine the fluid level of the tank. Sensors may allow remote monitoring of the tank and its fluid level. Additionally, software and software tools concerning sensors may define different configurations, parameters, and/or modes, to suit the invention. Different modes of data relay in certain embodiments of the present invention include the following:

Polled Mode: position values can be transmitted upon request.
Cyclic Mode: The position value is sent regular, adjustable intervals on the BUS.
Sync Mode: The position value is sent after a synchronization message (SYNC) is received. The position value is sent every n SYNCs (n21).
Stat Change Mode: The position value is transmitted whenever the position of the inclinometer changes (minimum time interval adjustable).

In one embodiment, the present invention comprises an inclinometer, which senses and measures the angle, inclination, slope, and/or elevation of an object (here, a fluid tank) and its relation to the force of gravity to determine the level of fluid within the tank. Inclinometers usually comprise a microelectromechanical systems ("MEMS") sensor cell that is embedded in a fully molded application specific integrated circuit ("ASK"). The angle is measured via the relative change in electrical capacity in the MEMS cell. Sensors typically sense and measure tilt on the x-axis. Having an inclinometer attached to the suction tube, and specifically the buoyant portion 6, allows the fluid level of the tank to be measured without the use of a cable 10, biasing member 14, level indicator tube 13, or indicator 12.

§ In another embodiment, the present invention comprises an accelerometer which may be used to measure the level of fluid in the tank, as well as its orientation. The accelerometer may be attached to the suction tube but is attached specifically to the buoyant portion 6 in this embodiment of the invention. An accelerometer is a device that measures the vibration, or acceleration of motion of a structure. The force caused by vibration or a change in motion (acceleration) causes the mass to compress the piezoelectric material, which produces an electrical change that is proportional to the force exerted upon it. Since the charge is proportional to the force, and the mass is constant, then the charge is also proportional to the acceleration. Using software, the signals produced by the accelerometer in the present invention may produce a zero-based output signal up to +1 to 5V. This dynamic range of may describe the maximum amplitude that the accelerometer can measure before distorting or clipping the output signal. Frequency response is determined by the mass, the piezoelectric properties of the crystal, and the resonance frequency of the case. Therefore, the typical movement of the suction tube would be positive above level, O at level and negative below level. Varying the percentage by depth movement of the buoyant portion can indicate where the buoyant portion 6 is in the tank. One example of the parameters could set O as being level and −5% as being the bottom movement of the buoyant portion 6. Any positive readings would indicate the suction tube is above level or in an upright position. Having an accelerometer attached to the suction tube, and specifically the buoyant portion 6, allows the fluid level of the tank to be measured without the use of a cable 10, biasing member 14, level indicator tube 13, or indicator 12.

In another embodiment, the present invention comprises a sending unit or fuel gage sending unit, which may be used to measure the level of fluid in the tank. The sending unit comprises a thin metal rod attached to the suction tube; in this embodiment, it is attached to the buoyant portion 6. The end of the rod is mounted to a variable resistor. A resistor is an electrical device that resists the flow of electricity. The more resistance there is, the less current will flow. In a fuel tank, the variable resistor consists of a strip of resistive material connected with one side to the ground. A wiper connected to the gauge slides along this strip of material conducts the current from the gauge to the resistor. If the wiper is close to the grounded side of the strip, there is less restrictive material in the path of the current, so the resistance is small: If the wiper is at the other end of the strip, there is more resistive material in the current's path, thus increasing the resistance. Using software, the sending unit in combination with the buoyant portion 6 of the suction tube can be used to interpret the resistance measured to determine the position of the suction tube and the level of fluid in the tank, without the use of a cable 10, biasing member 14, level indicator tube 13, or indicator 12.

In another embodiment, the present invention comprises a magnetostrictive level sensor, which may be used to measure the level of fluid in the tank. The magnetostrictive level sensor comprises a rigid wire made of magnetostrictive material inside a probe tube. The sensor's circuitry emits pulses of current through the wire, generating a circular magnetic field. A level transmitter is another magnet connected to the present invention. Its magnetic field magnetizes the wire axially. The two magnetic fields may be superimposed, generating a torsion wave running in both directions along the wire. One wave runs directly to the probe head while the other is reflected at the bottom of the probe tube. The time is measured between emission of the current pulse and arrival of the wave at the probe head. The position of the of buoyant portion 6 may be determined based on the transit time, which in turn indicates the level of the fluid in the tank without the use of a cable 10, biasing member 14, level indicator tube 13, or indicator 12.

Numerous characteristics and advantages have been set forth in the foregoing description, together with details of structure and function. The present invention can be manufactured in varying sizes depending on the application, i.e., size of the pick-up line, diameter of the tank and viscosity of the liquid. While the invention has been disclosed in its forms, it will be apparent to those skilled in the art that many modifications, additions, and deletions, especially in matters of shape, size, and arrangement of parts, can be made therein without departing from the spirit and scope of the invention and its equivalents as set forth in the following claims. Therefore, other modifications or embodiments as may be suggested by the teachings herein are particularly reserved as they fall within the breadth and scope of the claims here appended.

The invention claimed is:

1. A fluid tank, comprising:
an inlet port; and
suction tube system, wherein the suction tube system comprises a flexible suction tube;
a float connected to the flexible suction tube, a cable connected to at least one of the flexible suction tube and the float; a connector reversibly connected to the inlet port; and a level indicator system connected to the connector and the cable, wherein movement of the float changes a distance between the float and the inlet port resulting in indication of a change in level of the level indicator system and wherein the connector defines a fluid outlet aperture and the suction tube is in fluid communication with fluid outlet aperture.

2. The fluid tank of claim 1, wherein the fluid tank is a petroleum fuel tank.

3. The fluid tank of claim 1, wherein the fluid tank is a diesel fuel tank.

4. The fluid tank of claim 1, wherein the flexible suction tube comprises at least one of a foot valve and a check valve and the foot valve or the check valve is in fluid communication with fluid outlet aperture.

5. The fluid tank of claim 1, wherein an inlet nozzle is submerged in a fluid in the tank.

6. The fluid tank of claim 1, wherein the float is a rigid buoyant portion.

7. The fluid tank of claim 5, wherein the flexible suction tube defines a rotational range of movement of the rigid buoyant portion.

8. The fluid tank of claim 1, wherein the level indicator system comprises one of an accelerometer to determine the level of fluid in the fluid tank and an inlet nozzle magnetostrictive level sensor to determine the level of fluid in the fluid tank.

9. A fluid tank, comprising:
an inlet port; and
suction tube system, wherein the suction tube system comprises a flexible suction tube;
a float connected to the flexible suction tube, a cable connected to at least one of the flexible suction tube and the float; a connector reversibly connected to the inlet port, and a level indicator system connected to the connector and the cable, wherein movement of the float changes a distance between the float and the inlet port resulting in indication of a change in level of the level indicator, wherein the level indicator system comprises a level indicator tube, the cable comprising a first end and second end wherein the first end is connected to at least one of the float or flexible suction tube, a level indicator within the level indicator tube wherein the level indicator is connected to the second end of the cable, wherein the level indicator system comprises a biasing member biasing a level indicator toward a tank full indication.

10. The fluid tank of claim 9, wherein the connector defines a level indicator aperture and the cable extends through the level indicator aperture and into the level indicator tube.

11. The fluid tank of claim 10, wherein the direction opposite of the connector indicates a higher level in the fluid tank.

12. The fluid tank of claim 11, wherein the cable is fixedly connected to the flexible suction tube and slidingly connected to the float.

13. The fluid tank of claim 9, comprising a biasing member that biases the level indicator in a direction opposite of the connector.

14. The fluid tank of claim 13, wherein the float floats in a top section of a fluid within the fluid tank causing the flexible suction tube to bend and reducing a distance between the float and the connector.

* * * * *